United States Patent
Mukherjee et al.

(10) Patent No.: US 10,932,291 B2
(45) Date of Patent: Feb. 23, 2021

(54) METHODS, NETWORK NODES AND DEVICES FOR COMMUNICATING AT AN UNLICENSED FREQUENCY SPECTRUM

(71) Applicant: Telefonaktiebolaget LM Ericsson (publ), Stockholm (SE)

(72) Inventors: Amitav Mukherjee, Fremont, CA (US); Jung-Fu Cheng, Fremont, CA (US); Daniel Larsson, Lund (SE); Yu Yang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 104 days.

(21) Appl. No.: 15/765,890

(22) PCT Filed: Oct. 4, 2016

(86) PCT No.: PCT/SE2016/050940
§ 371 (c)(1),
(2) Date: Apr. 4, 2018

(87) PCT Pub. No.: WO2017/061930
PCT Pub. Date: Apr. 13, 2017

(65) Prior Publication Data
US 2018/0310334 A1    Oct. 25, 2018

Related U.S. Application Data

(60) Provisional application No. 62/237,201, filed on Oct. 5, 2015.

(51) Int. Cl.
*H04W 74/00*     (2009.01)
*H04L 5/00*      (2006.01)
(Continued)

(52) U.S. Cl.
CPC ......... *H04W 74/004* (2013.01); *H04L 5/0053* (2013.01); *H04W 72/14* (2013.01); *H04W 16/14* (2013.01); *H04W 72/1284* (2013.01)

(58) Field of Classification Search
CPC ... H04W 74/004; H04W 72/14; H04W 16/14; H04W 72/1284; H04L 5/0053
See application file for complete search history.

(56) References Cited

U.S. PATENT DOCUMENTS

2013/0022012 A1    1/2013  Lee et al.
2013/0163532 A1*   6/2013  Anderson ............. H04W 72/04
                                                    370/329
(Continued)

FOREIGN PATENT DOCUMENTS

EP    2 747 320 A2     6/2014
WO    2016 040254 A2   3/2016

OTHER PUBLICATIONS

3GPP TS 36.212 v12.6.0; Technical Specification; 3rd Generation Partnership Project; Technical Specification Group Radio Access Network; Evolved Universal Terrestrial Radio Access (E-UTRA); Multiplexing and channel coding (Release 12)—Sep. 2015.
(Continued)

*Primary Examiner* — Shukri Taha
(74) *Attorney, Agent, or Firm* — Withrow & Terranova, PLLC

(57) ABSTRACT

Embodiments herein relate to a method performed by a network node 110 of a wireless communication network 100 for communicating at an unlicensed frequency spectrum with a wireless device 121 having a device identity. The network node 110 sends an access grant to the wireless device according to the device identity, granting the wireless device access to an uplink communication channel of the unlicensed frequency spectrum. The network node also receives data from the wireless device 121, on the granted
(Continued)

uplink communication channel, the data comprising information on the identity of the wireless device 121, thus enabling the network node 110 to detect whether the wireless device that was granted access on the uplink communication channel is the same wireless device as the wireless device from which the data comprising the information on the uplink communication channel was subsequently received. Embodiments of the network node 110 are also described. Embodiments herein also relate to a wireless device 121 for communicating with a network node 110 of the wireless communication network 100 at an unlicensed frequency spectrum and a method therein.

22 Claims, 13 Drawing Sheets

(51) Int. Cl.
*H04W 72/14* (2009.01)
*H04W 72/12* (2009.01)
*H04W 16/14* (2009.01)

(56) References Cited

U.S. PATENT DOCUMENTS

| | | | | |
|---|---|---|---|---|
| 2013/0329711 | A1* | 12/2013 | Seo | H04J 11/0069 370/336 |
| 2014/0050185 | A1* | 2/2014 | Hooli | H04L 5/0053 370/329 |
| 2016/0066357 | A1* | 3/2016 | Goldhamer | H04W 16/14 455/426.1 |
| 2016/0135247 | A1* | 5/2016 | Ozturk | H04W 52/0212 455/436 |
| 2016/0278050 | A1* | 9/2016 | Nory | H04W 16/14 |
| 2017/0238272 | A1* | 8/2017 | You | H04J 11/0073 370/350 |

OTHER PUBLICATIONS

3GPP TSG-RAN WG2 #89bis; Bratislava, Slovakia; Source: Intel Corporation; Title: Uplink transmission with LBT (R2-151102)—Apr. 20-24, 2015.
19. Random Access; Pierre Bertrand and Jing Jiang (LTE—The UMTS Long Term Evolution: From Theory to Practice)—2009.
PCT International Search Report for International application No. PCT/SE2016/050940—dated Dec. 23, 2016.
3GPP TS 36.211 v12.3.0; Technical Specification; 3rd Generation Partnership Project; Technical Specification Group Radio Access Network; Evolved Universal Terrestrial Radio Access (E-UTRA); Physical channels and modulation (Release 12)—Sep. 2014.
3GPP TS 36.321 v12.1.0; Technical Specification; 3rd Generation Partnership Project; Technical Specification Group Radio Access Network; Evolved Universal Terrestrial Radio Access (E-UTRA); Medium Access Control (MAC) protocol specification (Release 12)—Mar. 2014.
3GPP TS 36.213 v12.3.0; Technical Specification; 3rd Generation Partnership Project; Technical Specification Group Radio Access Network; Evolved Universal Terrestrial Radio Access (E-UTRA); Physical layer procedures (Release 12)—Sep. 2014.
PCT Written Opinion of the International Searching Authority for International application No. PCT/SE2016/050940—dated Dec. 23, 2016.
Examination Report for European Patent Application No. 16784291.3, dated Apr. 4, 2019, 7 pages.
Eventhelix, "LTE Random Access Procedure and Contention Resolution," Feb. 25, 2015, available at http://blog.eventhelix.com/2015/02/25/lte-random-access-procedure-and-contention-resolution/, 2 pages.
Swamy, K, "RNTIs in LTE," 2014, available at http://howltestuffworks.blogspot.com/2014/06/rntis-in-lte.html, 9 pages.
Examination Report for European Patent Application No. 16784291.3, dated Dec. 11, 2019, 6 pages.

\* cited by examiner

METHODS, NETWORK NODES AND DEVICES FOR COMMUNICATING AT AN UNLICENSED FREQUENCY SPECTRUM

PRIORITY

This nonprofessional application is a U.S. National Stage Filing under 35 U.S.C. § 37 of International Patent Application Serial No, PCT/5E20167050940 filed Oct. 4, 2016, and entitled "METHODS, NETWORK NODES AND DEVICES FOR COMMUNICATING AT AN UNLICENSED FREQUENCY SPECTRUM" which claims priority to U.S. Provisional Patent Application No. 62/237,201 filed Oct. 5, 2015, both of which are hereby incorporated by reference in their entirety.

TECHNICAL FIELD

The present disclosure relates generally to methods, network nodes and wireless devices for communicating at an unlicensed frequency spectrum.

BACKGROUND

In today's wireless communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network comprises radio base stations providing radio coverage over at least one respective geographical area forming a cell. The cell definition may also incorporate frequency bands used for transmissions, which means that two different cells may cover the same geographical area but using different frequency bands. Wireless devices, also referred to herein as User Equipments, UEs, mobile stations, wireless communication devices and/or wireless terminals, are served in the cells by the respective radio base station and are communicating with respective radio base station. The wireless devices transmit data over an air or radio interface to the radio base stations in uplink (UL) transmissions and the radio base stations transmit data over an air or radio interface to the wireless devices in downlink (DL) transmissions.

Long Term Evolution (LTE) is a project within the 3rd Generation Partnership Project (3GPP) to evolve the WCDMA standard towards the fourth generation (4G) of mobile telecommunication networks. In comparisons with third generation (3G) WCDMA, LTE provides increased capacity, much higher data peak rates and significantly improved latency numbers. For example, the LTE specifications support downlink data peak rates up to 300 Mbps, uplink data peak rates of up to 75 Mbit/s and radio access network round-trip times of less than 10 ms. In addition, LTE supports scalable carrier bandwidths from 20 MHz down to 1.4 MHz and supports both Frequency Division Duplex (FDD) and Time Division Duplex (TDD) operation.

LTE is a Frequency Division Multiplexing technology wherein Orthogonal Frequency Division Multiplexing (OFDM) is used in a DL transmission from a radio base station to a wireless device. Single Carrier—Frequency Domain Multiple Access (SC-FDMA) is used in an UL transmission from the wireless device to the radio base station. Services in LTE are supported in the packet switched domain. The SC-FDMA used in the UL is also referred to as Discrete Fourier Transform Spread (DFTS)—OFDM. The basic LTE downlink physical resource may thus be seen as a time-frequency grid as illustrated in FIG. 1, where each Resource Element (RE) corresponds to one OFDM subcarrier during one OFDM symbol interval. A symbol interval comprises a cyclic prefix (cp), which cp is a prefixing of a symbol with a repetition of the end of the symbol to act as a guard band between symbols and/or facilitate frequency domain processing. Frequencies f or subcarriers having a subcarrier spacing $\Delta f$ are defined along an z-axis and symbols are defined along an x-axis. The uplink subframe has the same subcarrier spacing as the downlink and the same number of SC-FDMA symbols in the time domain as OFDM symbols in the downlink.

In the time domain, LTE downlink transmissions are organized into radio frames of 10 ms, each radio frame comprising ten equally-sized subframes, #0-#9, each with a $T_{subframe}=1$ ms of length in time as shown in FIG. 2. Furthermore, the resource allocation in LTE is typically described in terms of resource blocks, where a resource block corresponds to one slot of 0.5 ms in the time domain and 12 subcarriers in the frequency domain. Resource blocks are numbered in the frequency domain, starting with resource block 0 from one end of the system bandwidth. A pair of two adjacent resource blocks in time direction, e.g. 1.0 ms, is known as a resource block pair. For normal cyclic prefix, one subframe may consist of 14 OFDM symbols. The duration of each symbol may be approximately 71.4 µs.

Downlink transmissions are dynamically scheduled, i.e., in each subframe the base station transmits control information about which wireless devices data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 1. The reference symbols shown in the above FIG. 3 are the cell specific reference symbols (CRS) and are used to support multiple functions including fine time and frequency synchronization and channel estimation for certain transmission modes.

Uplink transmissions are dynamically scheduled, i.e., in each downlink subframe the base station transmits control information about which wireless devices should transmit data to the radio base station, e.g. an eNodeB, in subsequent subframes, and upon which resource blocks the data is transmitted. The uplink resource grid is comprised of data and uplink control information in the Physical Uplink Shared Channel, PUSCH, uplink control information in the Physical Uplink Control Channel, PUCCH, and various reference signals such as demodulation reference signals, DMRS, and sounding reference signals, SRS. DMRS are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 2. Note that UL DMRS and SRS are time-multiplexed into the UL subframe, and SRS are normally always transmitted in the last symbol of a normal UL subframe. The PUSCH DMRS is transmitted once every slot for subframes with normal cyclic prefix, and may be located in the fourth and eleventh SC-FDMA symbols.

From LTE Rel-11 onwards, DL or UL resource assignments may also be scheduled on the enhanced Physical Downlink Control Channel, EPDCCH. For Rel-8 to Rel-10 only the Physical Downlink Control Channel, PDCCH, is available. Resource grants are UE specific and are indicated by scrambling the DCI Cyclic Redundancy Check (CRC) with the UE-specific C-RNTI identifier. A unique C-RNTI is assigned by a cell to every UE associated with it, and may take values in the range 0001-FFF3 in hexadecimal format. A UE uses the same C-RNTI on all serving cells.

LTE Physical Uplink Shared Channel

The transport block processing for UL data sent on PUSCH, according to 3GPP TS 36.212 in shown in FIG. 5. Error detection is provided on each UL-SCH transport block through a CRC. The entire transport block is used to calculate the 24 CRC parity bits. After attaching CRC bits, the transport block is input to code block segmentation. If this input bit sequence is longer than the maximum code block size Z, segmentation of the input bit sequence is performed and an additional CRC sequence of 24 bits is attached to each code block; otherwise no segmentation and additional CRC attachment is performed. The remaining processing steps are channel coding of data and control information, rate matching, code block concatenation, multiplexing of data and control information, and channel interleaving.

If Uplink Control Information, UCI, is transmitted on the PUSCH, the channel coding for HARQ ACK, Rank Indicator, RI, and Precoding Matrix Indicator/Channel Quality Information, PMI/CQI, is done independently. The resource mapping after multiplexing of UCI and data on the PUSCH is shown in FIG. 6, where the PUSCH Reference Signal, RS, denotes the PUSCH DMRS described above. PUSCH data and UCI are not mapped to the same resource element, and UCI is preferably mapped in such a way that it is present in both slots of the UL subframe.

Carrier Aggregation

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier, CC. In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals may be scheduled in all parts of the wideband LTE Rel-10 carrier. The straightforward way to obtain this would be by means of Carrier Aggregation, CA. CA implies that an LTE Rel-10 terminal may receive multiple CC, where the CCs have, or at least have the possibility to have, the same structure as a Rel-8 carrier. CA is illustrated in FIG. 7. A CA-capable UE is assigned a primary cell, PCell, which may be always activated, and one or more secondary cells, SCells, which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

Wireless Local Area Network, WLAN

In typical deployments of WLAN, carrier sense multiple access with collision avoidance, CSMA/CA, is used for medium access. This means that the channel is sensed to perform a clear channel assessment, CCA, and a transmission is initiated only if the channel is declared as Idle. In case the channel is declared as Busy, the transmission is essentially deferred until the channel is deemed to be Idle.

A general illustration of the listen before talk, LBT, mechanism of Wi-Fi is shown in FIG. 8 for handling a Wi-Fi communication channel. After a Wi-Fi station A transmits a data frame 802 to a station B, station B shall transmit the ACK frame 804 back to station A with a delay 803, called Short Interframe Space, SIFS, of e.g. 16 μs. Such an ACK frame is transmitted by station B without performing a LBT operation. To prevent another station interfering with such an ACK frame transmission, a station shall defer for a duration referred to as Distributed Co-ordinate Function, DSF, Interframe Space, DIFS, of e.g. 34 μs, after the channel is observed to be occupied before assessing again whether the channel is occupied. Therefore, a station that wishes to transmit first performs a CCA by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

In the above basic protocol, when the medium becomes available, multiple Wi-Fi stations may be ready to transmit, which may result in collision. To reduce collisions, stations intending to transmit select a random backoff counter and defer for that number of slot channel idle times. The random backoff counter is selected as a random integer drawn from a uniform distribution over the interval of [0, Contention Window (CW)]. The default size of the random backoff contention window, CWmin, is set in the IEEE specs. Note that collisions may still happen even under this random backoff protocol when there are many stations contending for the channel access. Hence, to avoid recurring collisions, the backoff contention window size CW is doubled whenever the station detects a collision of its transmission up to a limit, CWmax, also set in the IEEE specs. When a station succeeds in a transmission without collision, it resets its random backoff contention window size back to the default value CWmin.

For multi-carrier operation, Wi-Fi follows a hierarchical channel bonding scheme to determine its transmission bandwidth for a frame, which could be 20 MHz, 40 MHz, 80 MHz, or 160 MHz for example. In the 5 GHz band, wider Wi-Fi channel widths of 40 MHz, 80 MHz, 160 MHz or 80+80 MHz are formed by combining contiguous 20 MHz sub-channels in a non-overlapping manner. A pre-determined primary channel performs the CW-based random access procedure after a defer period if necessary, and then counts down the random number generated. The secondary channels only perform a quick CCA check for a Point Coordination Function, PCF, Interface Space, PIFS, duration, generally 25 μs, before the potential start of transmission to determine if the additional secondary channels are available for transmission. Based on the results of the secondary CCA check, transmission is performed on the larger bandwidths; otherwise transmission falls back to smaller bandwidths. The Wi-Fi primary channel is preferably always included in the transmissions, i.e., transmission on secondary channels alone is normally not allowed.

Load-Based Clear Channel Assessment in Europe Regulation EN 301.893

For a wireless device (called equipment below) not utilizing the Wi-Fi protocol, EN 301.893, v. 1.7.1 provides the following requirements and minimum behavior for the load-based CCA:

1) Before a transmission or a burst of transmissions on an Operating Channel, the equipment shall perform a CCA check using "energy detect". The equipment shall observe the Operating Channel(s) for the duration of the CCA observation time which shall be not less than 20 μs. The CCA observation time used by the equipment shall be declared by the manufacturer. The Operating Channel shall be considered occupied if the energy level in the channel exceeds the threshold corresponding to the power level given in point 5 below. If the equipment finds the channel to be clear, it may transmit immediately, see point 3 below.

2) If the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that need to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer. The counter is decremented every time a CCA slot is considered to be "unoccupied". When the counter reaches zero, the equipment may transmit.

3) The total time that an equipment makes use of an Operating Channel is the Maximum Channel Occupancy Time which shall be less than (13/32)×q ms, with q as defined in point 2 above, after which the device shall perform the Extended CCA described in point 2 above.

4) The equipment, upon correct reception of a packet which was intended for this equipment, may skip CCA and immediately, see NOTE 4, proceed with the transmission of management and control frames, e.g. ACK and Block ACK frames. A consecutive sequence of transmissions by the equipment, without it performing a new CCA, shall not exceed the Maximum Channel Occupancy Time as defined in point 3 above.

NOTE 4: For the purpose of multi-cast, the ACK transmissions, associated with the same data packet, of the individual devices are allowed to take place in a sequence.

5) The energy detection threshold for the CCA shall be proportional to the maximum transmit power, PH, of the transmitter: for a 23 dBm equivalent isotropically radiated power, e.i.r.p., transmitter, the CCA threshold level, TL, shall be equal or lower than −73 dBm/MHz at the input to the receiver, assuming a 0 dBi receive antenna. For other transmit power levels, the CCA threshold level TL shall be calculated using the formula: TL=−73 dBm/MHz+23−PH, assuming a 0 dBi receive antenna and PH specified in dBm e.i.r.p.

An example to illustrate the EN 301.893 LBT is provided in FIG. 9.

Licensed-Assisted Access, LAA, to Unlicensed Spectrum Using LTE

Up to now, the spectrum used by LTE is dedicated to LTE. This has the advantage that the LTE system does not need to care about the coexistence issue and the spectrum efficiency may be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum. Unlicensed spectrum may, by definition, be simultaneously used by multiple different technologies. Therefore, LTE needs to consider the coexistence issue with other systems such as IEEE 802.11, i.e. Wi-Fi. Operating LTE in the same manner in unlicensed spectrum as in licensed spectrum may seriously degrade the performance of Wi-Fi, as Wi-Fi will not transmit once it detects the channel is occupied.

Furthermore, one way to utilize the unlicensed spectrum reliably is to transmit essential control signals and channels on a Primary carrier on a licensed spectrum. That is, as shown in FIG. 10, a UE is connected to a PCell in the licensed band and one or more SCells in the unlicensed band. In this application we denote a secondary cell in unlicensed spectrum as licensed-assisted access secondary cell (LAA SCell).

Multi-Carrier Operation

The use of LTE carrier aggregation, CA, introduced in Rel-10, offers means to increase the peak data rate, system capacity and user experience by aggregating radio resources from multiple carriers that may reside in the same band or different bands. In Rel-13, LAA has attracted a lot of interest in extending the LTE carrier aggregation feature towards capturing the spectrum opportunities of unlicensed spectrum in the 5 GHz band. WLAN operating in the 5 GHz band nowadays already supports 80 MHz in the field and 160 MHz is to follow in Wave 2 deployment of IEEE 802.11ac. Enabling the utilization of multi-carrier operation on unlicensed carrier using LAA is deemed necessary as further CA enhancements. The extension of the CA framework beyond 5 carriers has been started in LTE Rel-13. The objective is to support up to 32 carriers in both UL and DL.

SUMMARY

It is an object of the embodiments herein to improve the utilization of an unlicensed frequency spectrum in a wireless communications network.

According to a first aspect of embodiments herein, the object may be achieved a method performed by a network node of a wireless communication network, for communicating at an unlicensed frequency spectrum with a wireless device having a device identity. The network node sends an access grant to the wireless device according to the device identity, granting the wireless device access to an uplink communication channel of the unlicensed frequency spectrum. The network node also receives data from the wireless device, on the granted uplink communication channel, the data comprising information on the identity of the wireless device, thus enabling the network node to detect whether the wireless device that was granted access on the uplink communication channel is the same wireless device as the wireless device from which the data comprising the information on the uplink communication channel was subsequently received.

According to a second aspect of the embodiments herein, a network node is provided, operable in a wireless communication system and configured for communicating at an unlicensed frequency spectrum with a wireless communication device having a device identity. The network node is operative to send an access grant to the wireless device according to the device identity, granting the wireless device access to an uplink communication channel of the unlicensed frequency spectrum, and receive data from the wireless device, on the granted uplink communication channel, the data comprising information on the identity of the wireless device, thus enabling the network node to detect whether the wireless device that was granted access on the uplink communication channel is the same wireless device as the wireless device from which the data comprising the information on the uplink communication channel was subsequently received.

According to a third aspect of the embodiments herein, the object may be achieved by providing a method performed by a wireless device of a wireless communication network, for communicating with a network node of the wireless communication network at an unlicensed frequency spectrum, the wireless device having a device identity. The wireless device receives an access grant from the network node, granting the wireless device access to an uplink communication channel of the unlicensed frequency spectrum. The wireless device also sends data to the network node on the granted uplink communication channel, the data comprising information on the identity of the wireless device, thus enabling the network node to detect whether the wireless device that was granted access on the uplink communication channel is the same wireless device that subsequently sent the data comprising the information on the uplink communication channel.

According to a fourth aspect of the embodiments herein, a wireless device is provided, operable in a wireless network and configured for communicating with a network node of the wireless communication network at an unlicensed frequency spectrum, the wireless device having a device identity. The wireless device is operative to receive an access grant from the network node, granting the wireless device access to an uplink communication channel of the unlicensed frequency spectrum, and send data to the network node on the granted uplink communication channel, the data comprising information on the identity of the wireless device, thus enabling the network node to detect whether the wireless device that was granted access on the uplink communication channel is the same wireless device that subsequently sent the data comprising the information on the uplink communication channel.

According to a fifth aspect of the embodiments herein, computer programs are also provided configured to perform the methods described above. Further, according to a sixth aspect of the embodiments herein, carriers are also provided configured to carry the computer programs configured for performing the methods described above.

By embedding the device identity in transmissions in the wireless communications network as described above, the network node is able to compare the wireless device that was granted access on the uplink communication with the wireless device from which the data comprising the information on the uplink communication channel was subsequently received. This means, for example, that multiple wireless device may be allocated the same uplink communication resources yet still be distinguishable at the network node. Hence, the utilization of an unlicensed frequency spectrum in a wireless communications network is improved.

Further possible features and benefits of this solution will become apparent from the detailed description below.

BRIEF DESCRIPTION OF THE DRAWINGS

The solution will now be described in more detail by means of exemplary embodiments and with reference to the accompanying drawings, in which.

DESCRIPTION

The figures are schematic and simplified for clarity, and they merely show details for the understanding of the embodiments presented herein, while other details have been left out.

Figure 1:
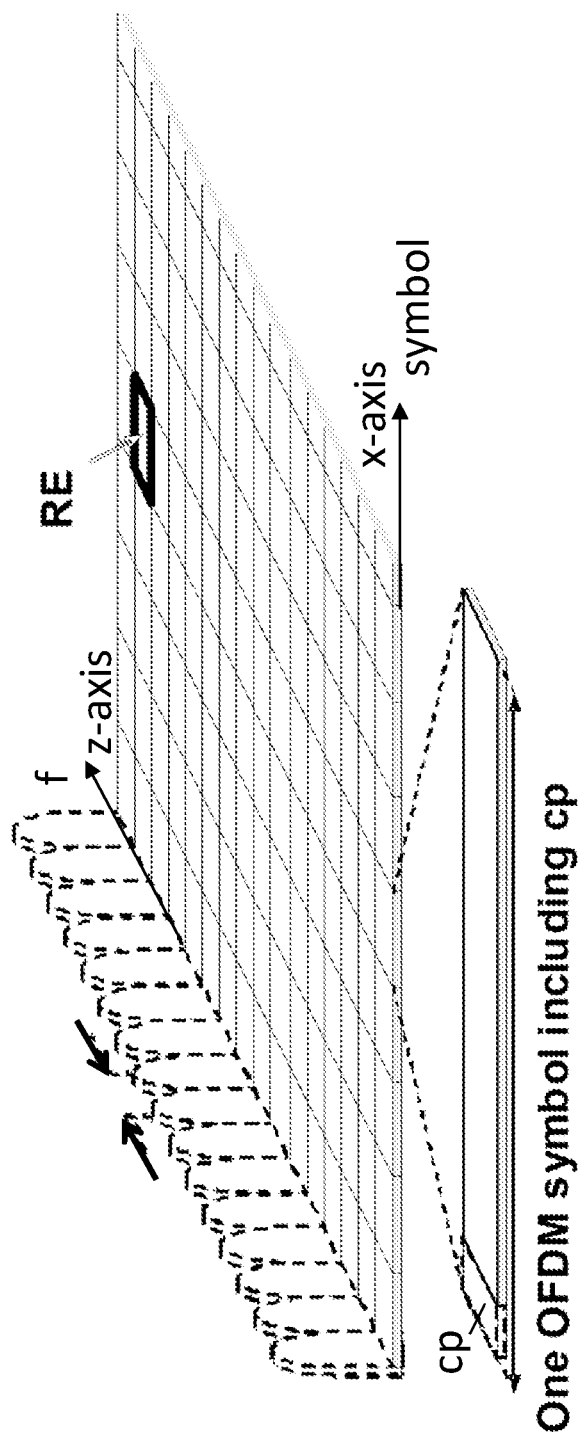
FIG. 1 is a schematic block diagram of a LTE downlink physical resource.
Figure 2:
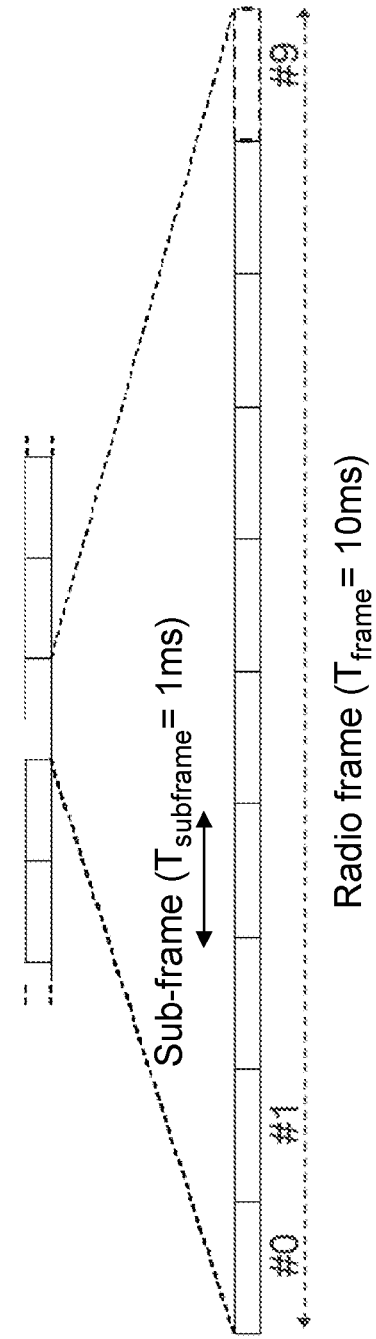
FIG. 2 is a schematic overview depicting radio frames.
Figure 3:
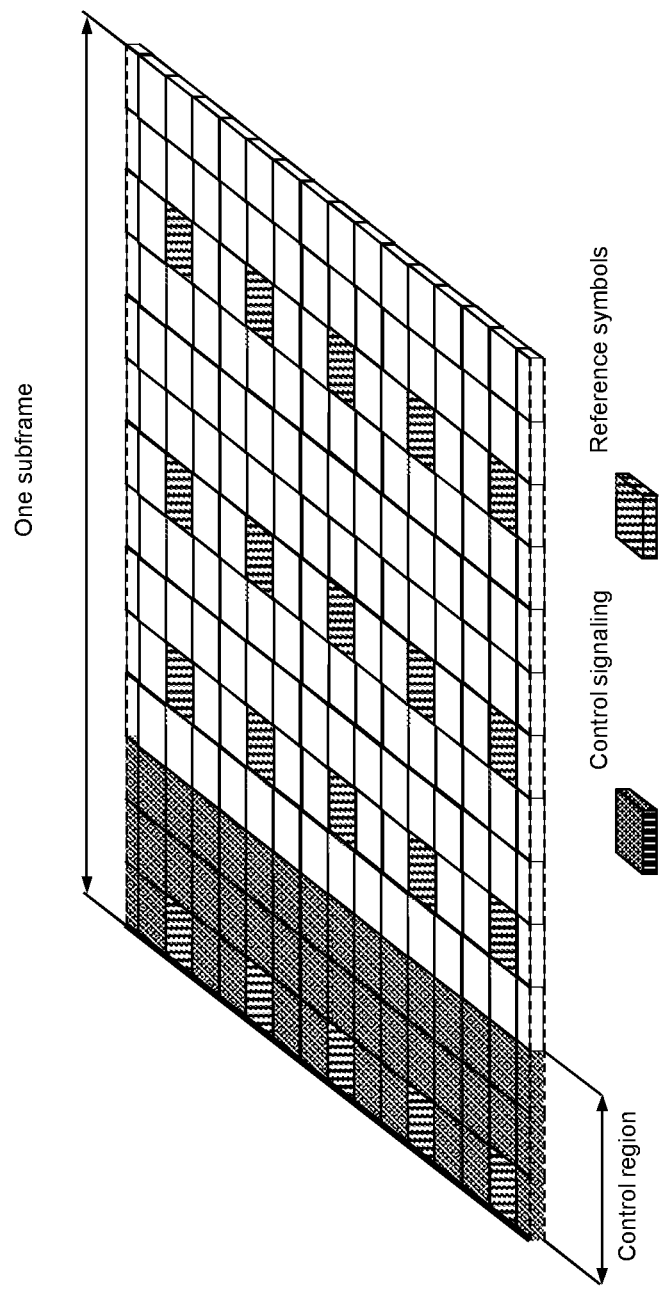
FIG. 3 is a schematic overview depicting a DL subframe.
Figure 4:
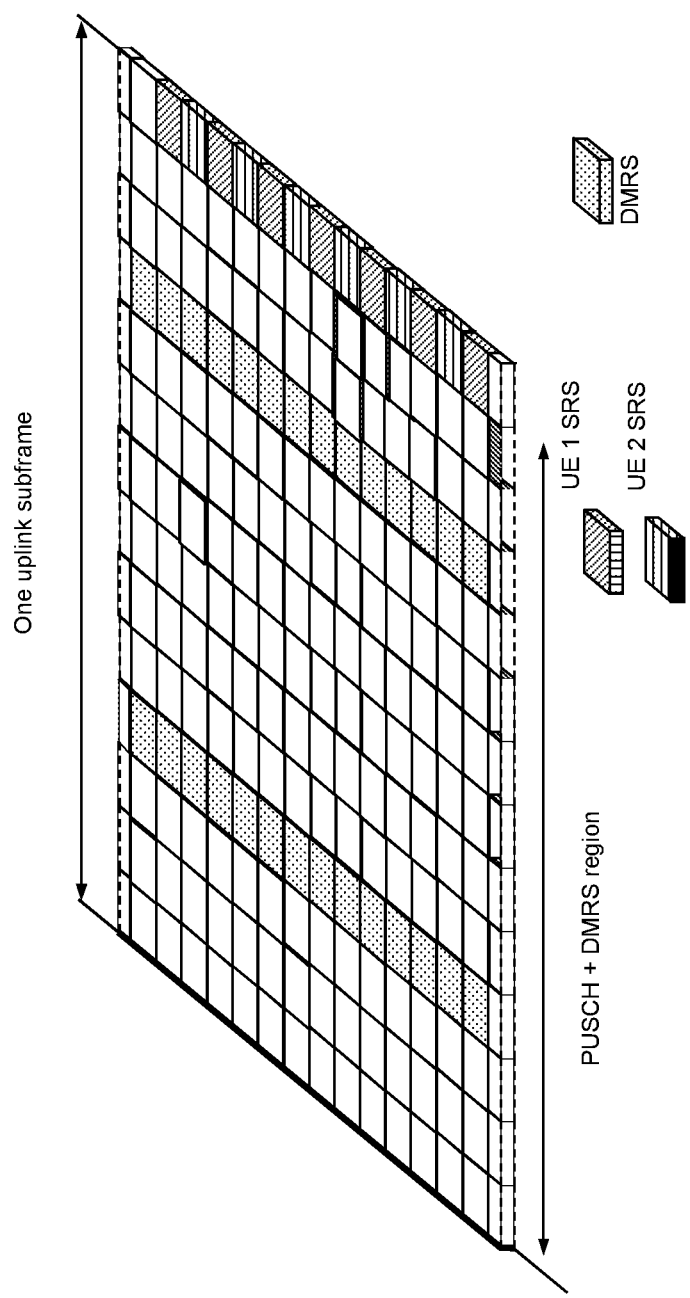
FIG. 4 is a schematic overview depicting an UL subframe.
Figure 5:
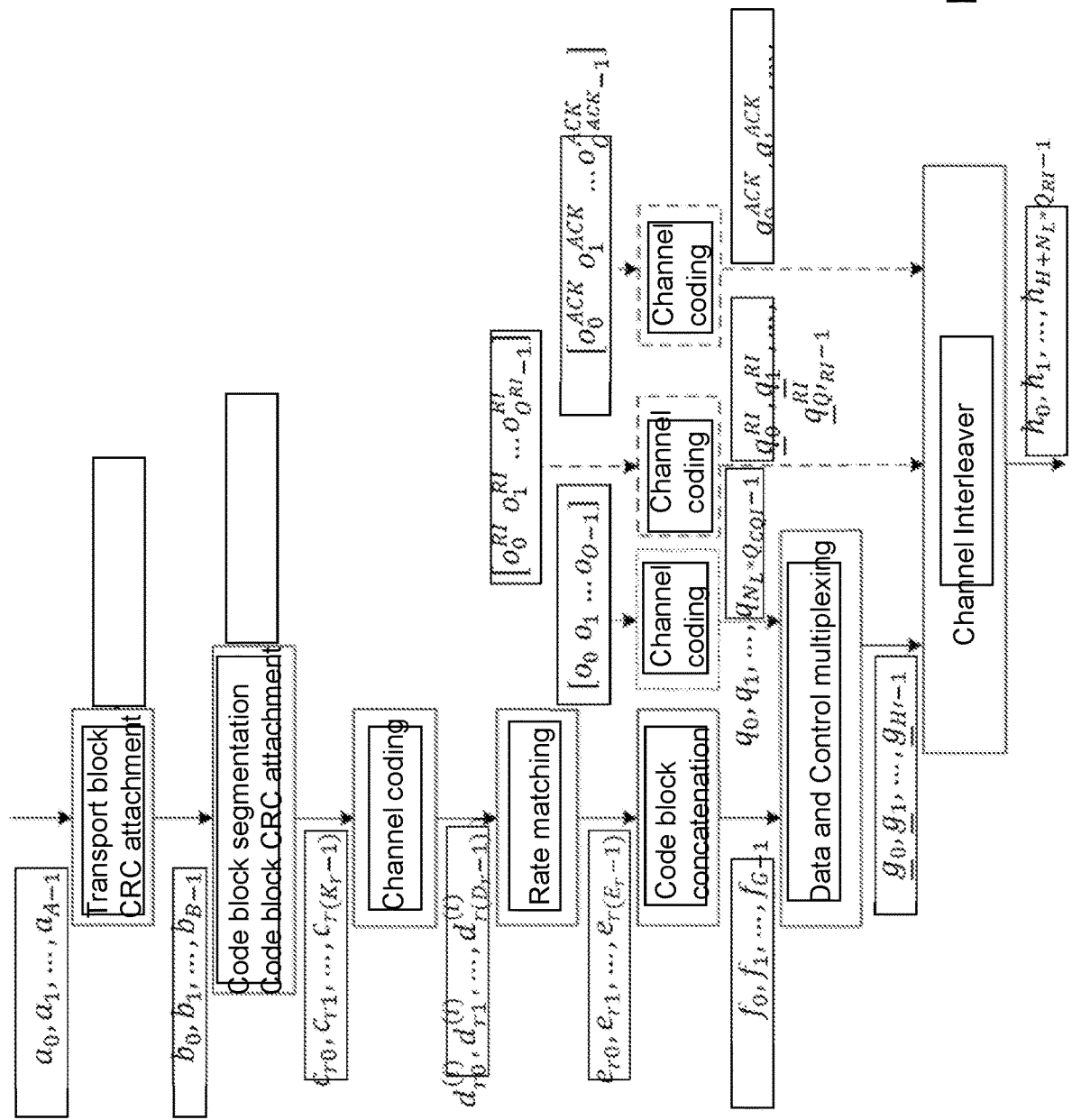
FIG. 5 is a flow chart showing PUSCH transport block processing.
Figure 6:
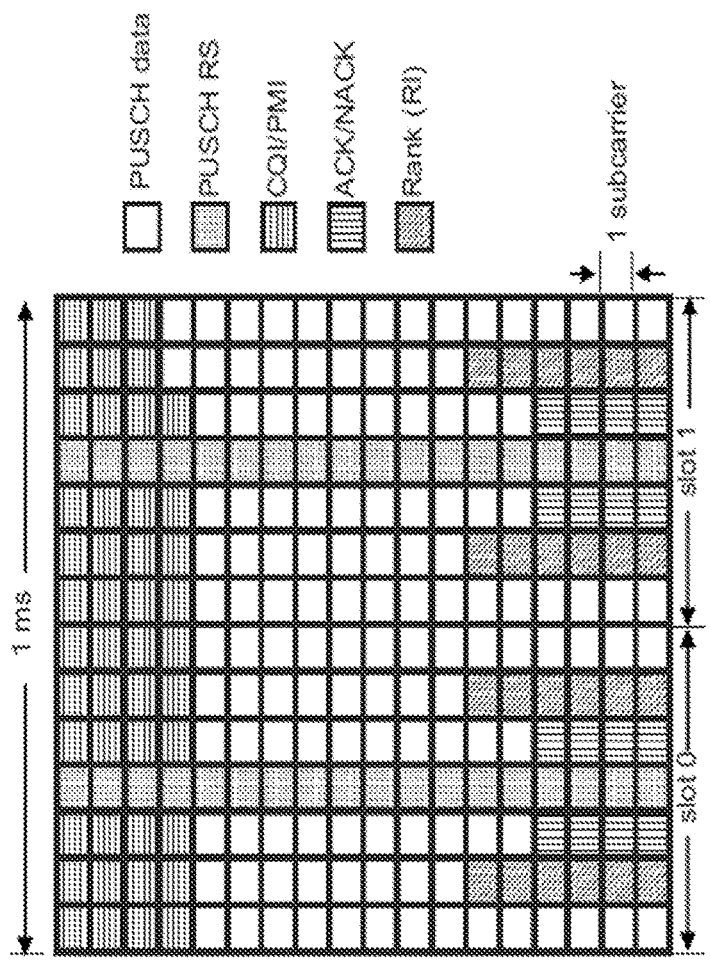
FIG. 6 is a chart showing multiplexing of control information and data on a PUSCH.
Figure 7:
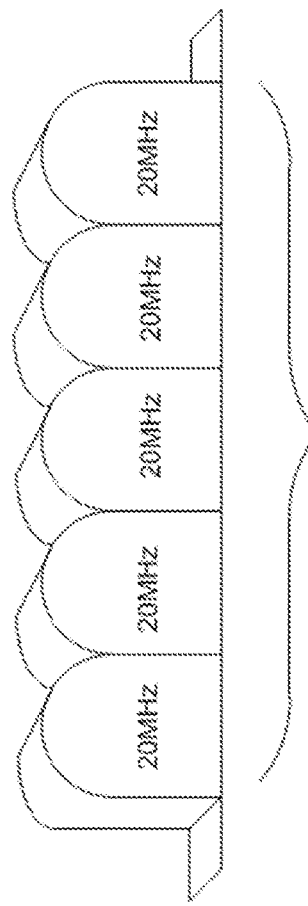
FIG. 7 is a schematic overview of carrier aggregation.
Figure 8:
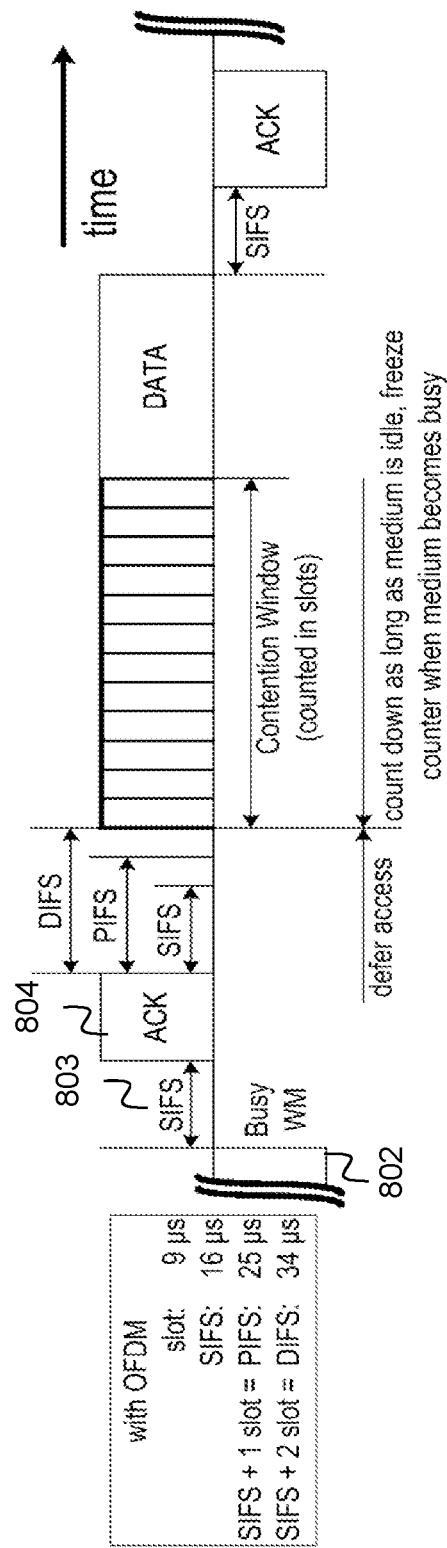
FIG. 8 is a schematic illustration of the listen before talk process in Wi-Fi.
Figure 9:
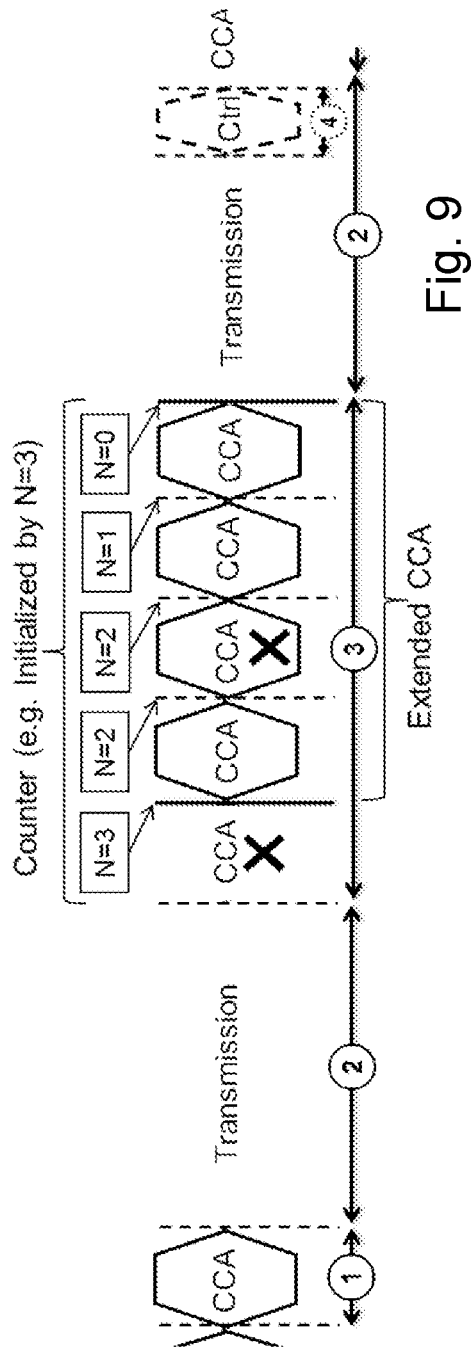
FIG. 9 is a schematic illustration of listen before talk in EN 301.893
Figure 10:
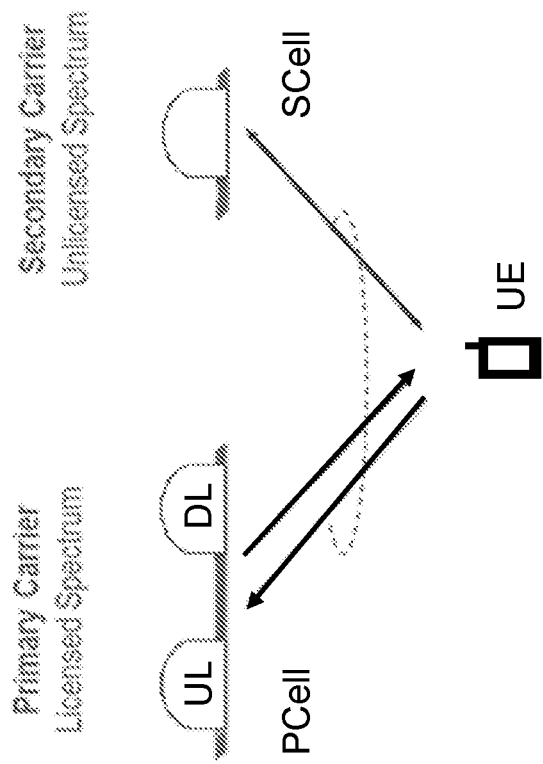
FIG. 10 is a schematic overview of Licensed-assisted access to unlicensed spectrum using LTE carrier aggregation.
Figure 11:
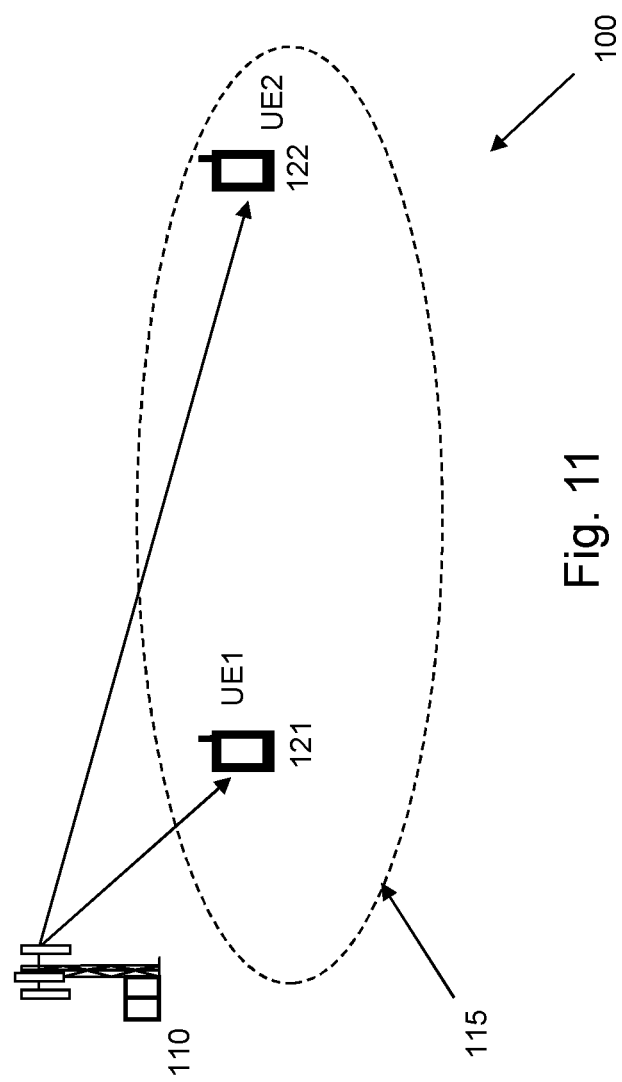
FIG. 11 is a schematic overview of a wireless communication network in which the embodiments presented herein may be used.

FIG. 11 depicts a wireless communications network 100 in which embodiments herein may be implemented. In some embodiments, the wireless communications network 100 may be a wireless communications network such as a Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or WiFi, or any other similar cellular network or system. The wireless communication network 100 is exemplified herein as an LTE network.

The wireless communications system 100 comprises a network node 110. The network node 110 serves at least one cell 115. The network node 110 may e.g. be a base station, a radio base station, eNB, eNodeB, a Home Node B, a Home eNode B, femto Base Station (BS), pico BS or any other network unit capable to capable of communicating with a wireless device within the cell served by the network node depending e.g. on the radio access technology and terminology used. The network node 110 may also be e.g. a base station controller, a network controller, a relay node, a repeater, an access point, a radio access point, a Remote Radio Unit (RRU) or a Remote Radio Head (RRH).

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. The network node 110 communicates over the air or radio interface operating on radio frequencies with the wireless devices within range of the network node 110

In FIG. 11, a first wireless device 121 and a second wireless device 122 is located within the cell 115. The first and second wireless devices 121, 122 are configured to communicate within the wireless communications network 100 via the network node 110 over a radio link when present in the cell 115 served by the network node 110. The first and second wireless devices 121, 122 may e.g. be any kind of wireless devices such as mobile phones, cellular phones, Personal Digital Assistants (PDAs), a smart phones, tablets, sensors equipped with wireless devices, Laptop Mounted Equipments (LMEs) (e.g. USBs), Laptop Embedded Equipments (LEEs), Machine Type Communication (MTC) devices, or Machine to Machine (M2M) devices, Customer Premises Equipments (CPEs), etc.

As part of the developing of the embodiments described herein, a problem will first be identified and discussed.

Due to the use of LBT before UL channel access, uncertainties may arise at the network node regarding the identity of the wireless device, UE, that has transmitted on UL resource blocks, if the network node detects that an UL signal is present. In other words, the network node may be uncertain if the wireless device that obtained channel access is the same wireless device that was granted those UL resources. Such ambiguities are increased when a UL grant for UL transmission of one or more subframes is valid over a certain time window, and if multiple wireless devices are allocated overlapping resource grants to increase resource utilization on unlicensed carriers.

It has been observed that this problem may be alleviated by embedding UE identity into UL transmissions on an unlicensed carrier/communication channel. In the following, various embodiments for embedding UE identity into UL transmissions on unlicensed carriers are proposed. According to one embodiment, the UE identity is embedded at the physical, PHY, layer into UL transmissions on unlicensed carriers.

Figure 12:
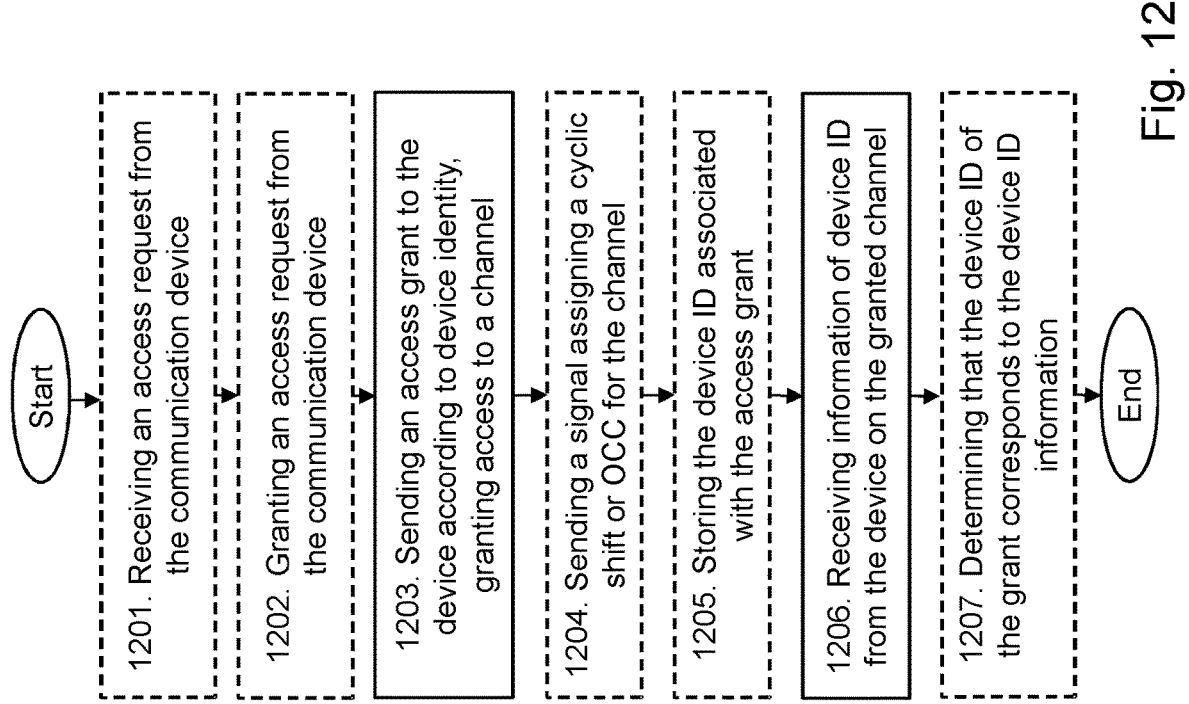
FIG. 12 is a flow chart of exemplary embodiments performed by a network node.

FIG. 12 is an illustrated example of actions or operations which may be taken or performed by the network node 110, for communicating at an unlicensed frequency spectrum with a wireless device 121 having a device identity. The method may comprise the following actions.

Action 1201. Optionally, according to some embodiments, the network node 110 may, before the action 1203 of sending the access grant, receive an access request message from the wireless device 121, requesting access to the unlicensed frequency spectrum. This access request message may comprise a first information of the device identity.

Action 1202. Optionally, according to some embodiments, the network node 110 may, in response to a received access request message, grant the wireless device 121 access to the uplink communication channel. The sending 1203 of the access grant is then performed in response to the granting of the access.

Action 1203. The network node 110 sends an access grant to the wireless device 121 according to the device identity, granting the wireless device 121 access to an uplink communication channel of the unlicensed frequency spectrum.

Action 1204. Optionally, the network node 110 may send a signal to the wireless device 121 assigning a cyclic shift and/or an orthogonal cover code, OCC, for communication on the uplink communication channel. The cyclic shift and/or OCC being different from other cyclic shifts and/or OCCs assigned to other wireless devices that have been granted access to the uplink communication channel. Here, the received device identity information is the cyclic shift and/or the OCC.

Action 1205. Optionally, according to some embodiments, the network node 110 may also store the device identity associated with the access grant.

Action 1206. The network node 110, in response to the sending of the access grant, receives data from the wireless device 121, on the granted uplink channel, the data comprising information on the identity of the wireless device 121, thus enabling the network node to detect whether the wireless device that was granted access on the uplink communication channel is the same wireless device as the wireless device from which the data comprising the information on the uplink communication channel was subsequently received.

Action 1207. The network node 110 may also determine, in response to the reception 1205 of the data comprising the device identity information, that the device identity information corresponds to the wireless device to which the access grant was sent, e.g. by comparing the received device identity information to the stored device identity.

Figure 13:
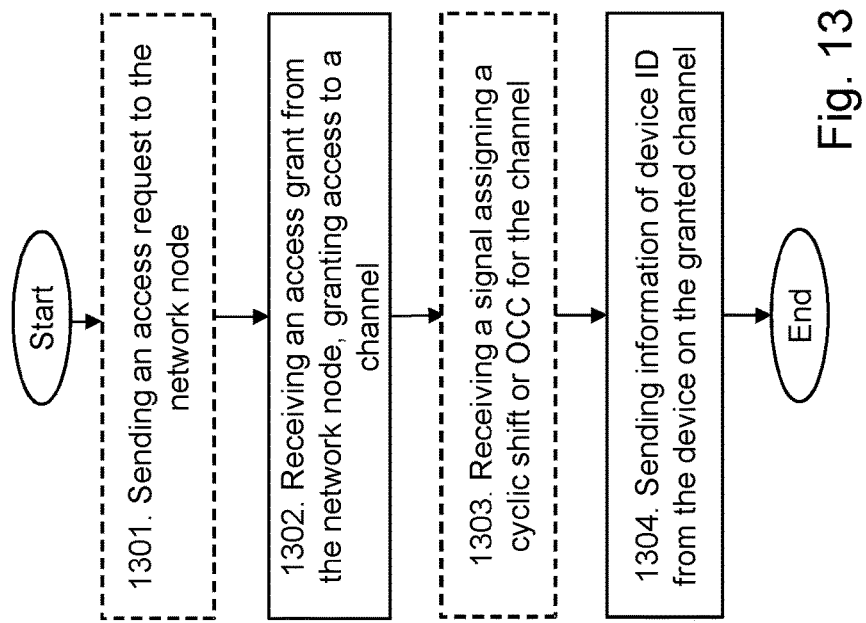
FIG. 13 is a flow chart of exemplary embodiments performed by a wireless device.

FIG. 13 is an illustrated example of actions or operations which may be taken or performed by the wireless device 121 for communicating with a network node 110 of the wireless communication network 100 at an unlicensed frequency spectrum, the device having a device identity. The method may comprise the following actions.

Action 1301. Optionally, according to some embodiments, the wireless device 121 may send an access request message to the network node 110, requesting access to the unlicensed frequency spectrum provided by the network node 100. The message may comprising a first information of the wireless device identity.

Action 1302. The wireless device 121 receives an access grant from the network node, granting the wireless device 121 access to an uplink communication channel of the unlicensed frequency spectrum.

Action 1303. Optionally, according to some embodiments, the wireless device 121 may also receive a signal from the network node assigning a cyclic shift and/or an orthogonal cover code, OCC, for communication on the channel, the cyclic shift and/or OCC being different from other cyclic shifts and/or OCCs assigned to other devices that have been granted access to the channel. The device identity information sent in action 1304 may then be the cyclic shift and/or the OCC.

Action 1304. The wireless device 121 sends data to the network node on the granted uplink channel, the data comprising information on the identity of the device, thus enabling the network node to detect whether the wireless device 121 that was granted access on the uplink channel is the same wireless device 121 that subsequently sent the data comprising the information on the uplink channel.

Further details of the embodiments described above will now be described in more detail below with reference to the Figs.

Different embodiments are described next for how to indicate the UE identity in UL transmissions on unlicensed bands. These approaches hold for both FDD and TDD LAA, and for single carrier or multi-carrier scenarios. It is to be understood that the proposed embodiments also apply to different variations of LTE operating in unlicensed spectrum, such as LTE-U and standalone LTE-U.

PUSCH CRC Scrambling

Figure 14:
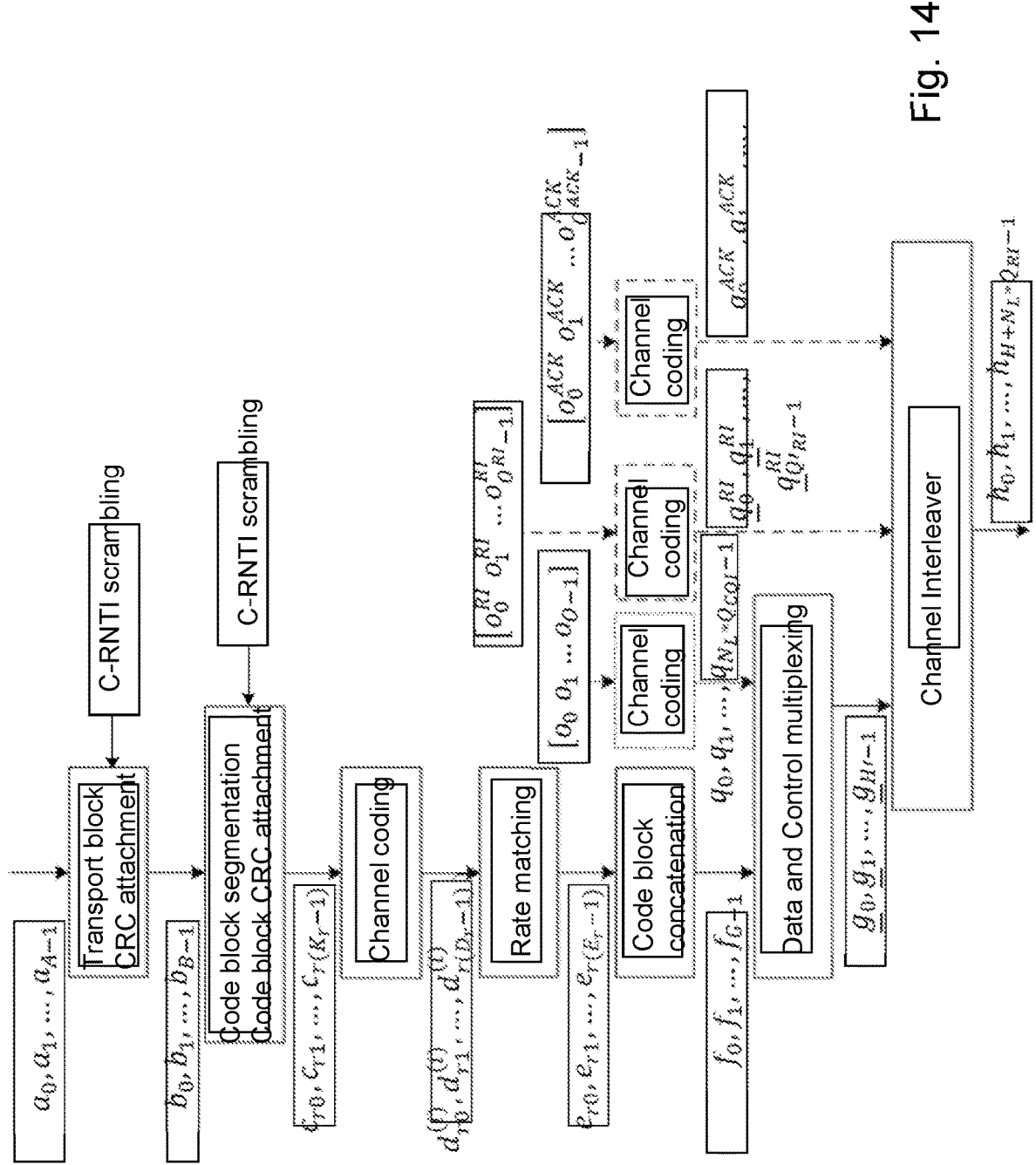
FIG. 14 is a flow chart of an embodiment for CRC scrambling with UE C-RNTI for UL data transmissions.

In some embodiments, the wireless device 121, which may be able to access the channel and transmit data on the PUSCH, may scramble its UL transport block CRCs with its C-RNTI. The scrambling by the wireless device 121 may also be performed with the code block CRCs if applicable. As a non-limiting example, a binary XOR operation may be performed by the wireless device 121 between the first 16 bits of a TB CRC and the 16-bit UE C-RNTI, as well as the first 16 bits of a code block CRC and the 16-bit UE C-RNTI. The scrambling may performed by the wireless device 121 for at least one TB CRC and code block CRC, where the number of CRCs to be scrambled and scrambling bit locations may be configured by the network node 110 via higher-layer signaling. An example illustration of the CRC scrambling and UL data transmission procedure is provided in FIG. 14.

The network node 110 may attempt to descramble the TB CRCs after decoding the signal received on the scheduled UL resource blocks from the wireless device 121. If the CRC is successfully descrambled by the C-RNTI corresponding to the wireless device that was assigned with those UL resources, then the network node 110 will not reschedule a retransmission for that particular TB. If the network node 110 cannot descramble the CRC with the C-RNTI of the wireless device scheduled on those resources, the network node 110 may then not update the UL soft buffer contents corresponding to the scheduled wireless device and may schedule a retransmission. The network node 110 may then try to descramble the CRC using other C-RNTIs that were assigned to other wireless devices being served on that particular cell. This may be performed in order to determine which wireless device actually obtained channel access. If the same UL resources were allocated to multiple wireless devices in order to increase the likelihood of unlicensed resource utilization, the network node 110 may use the C-RNTI descrambling to distinguish between them.

UE Identifier in UCI Sent on PUSCH

In some embodiments, the wireless device 121 may include the UE C-RNTI in UCI transmissions sent on the PUSCH. As an example, the 16-bit C-RNTI may be sent by the wireless device 121 on the first and/or last symbol of each UL slot after suitable channel coding. The channel coding may be a (n,k) linear code similar to that used for certain CQI/PMI encoding cases, such as the Reed-Muller code used in PUCCH format 3, or may be a convolutional code.

In some embodiments, the wireless device 121 may concatenate the UE C-RNTI with other UCI, for example CQI/PMI, to be jointly encoded and transmitted on PUSCH. Alternatively, the encoding of UE C-RNTI and UCI, for example CQI/PMI, may be applied separately by the wireless device 121 and the encoded bits may be concatenated and resource mapped together on PUSCH by the wireless device 121. In some embodiments, the 8-bit CRC included with CSI reports exceeding 11 bits may be scrambled with the 8 most or least significant bits of the UE C-RNTI by the wireless device 121. In some embodiments, the 8-bit CRC included with HARQ-ACK feedback exceeding 22 bits may be scrambled with the 8 most or least significant bits of the UE C-RNTI by the wireless device 121.

UE Identifier in UL Initial Signal

Figure 15:
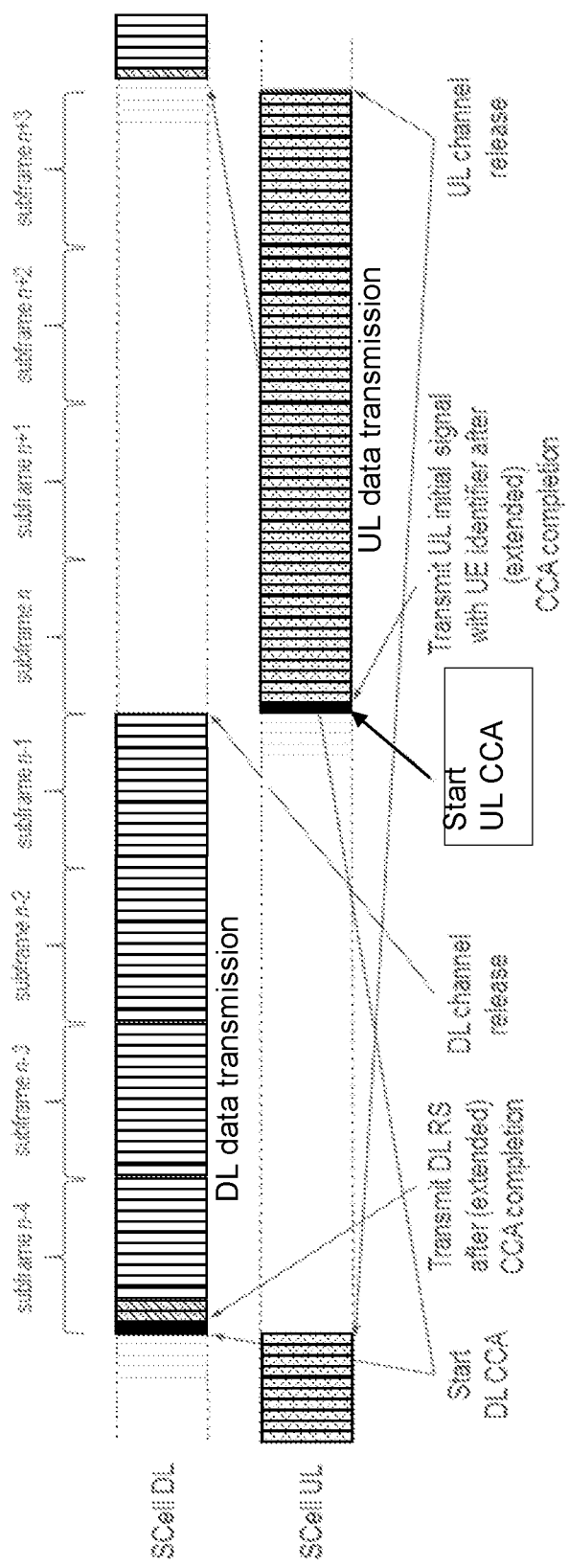
FIG. 15 is a schematic example of sending UE identifier in UL initial signal.

In another embodiment, the wireless device 121 may include a UE identifier in the initial signal sent after obtaining channel access and before commencing PUSCH transmissions. A general example is shown in FIG. 15. In some embodiments, certain sequences sent in the initial signal may be UE-specific and may be derived based on or more factors including the UE C-RNTI. In some embodiments, the UE C-RNTI may be signaled explicitly in the initial signal by the wireless device 121.

UE Identify Based on OCC and Cyclic Shift

In another embodiment, different wireless devices that are assigned the same resource are assigned different cyclic shift and potentially OCC on the DMRS. The network node 110 may distinguish which wireless device is transmitting by detecting the cyclic shift and potentially OCC. Based on this information, the network node 110 will update its soft buffer for the given UE and HARQ process. In some embodiments, the wireless device 121 may use a different cyclic shift and/or OCC on the DMRS based on its C-RNTI or the MNC-UE identity sequence defined in the above. In other words, the network node 110 does not need to explicitly signal the selection of cyclic shift and/or OCC to the wireless device 121. It is possible that the network node 110 assigns different wireless devices to the same frequency resources. In such cases, the network node 110 may explicitly assign different cyclic shift and/or OCC.

According to some embodiments, the LTE network itself is identified using Public Land Mobile Network Identity, PLMN-ID, which will have a three digit Mobile Country Code, MCC, and a two or three digit Mobile Network Code, MNC. For example, the MCC for the UK is 234, while Vodafone's UK network uses a MNC of 15. The MNC, having two or three digits, may be presented using 8 or 12 bits. In the unlicensed bands, several different operators may deploy LAA networks using overlapping frequencies. It may thus arise that different networks assign identical UE C-RNTI to different wireless devices belonging to different networks. Therefore, to further enhance the reliability of verifying whether the received signals originated from the scheduled wireless device of the network, additional information related to the network may be incorporated with the C-RNTI assigned to the wireless device 121 by the network node 110. In some embodiments, the 8-bit MNC or the first or last 8 bits of the MNC may be combined with the UE C-RNTI to form a 24-bit MNC-UE identity sequence. This 24-bit MNC-UE identity sequence may be used in place of the C-RNTI in the embodiments described herein.

Some or all of the above methods and embodiments provide some or all of the below advantages: The network node 110 is no longer a network node that has any ambiguity if the wireless device that obtained channel access is the same wireless device that was granted those UL resources. Also, pollution of network node receiver soft buffer is prevented in network node 110. Further, the network node 110 comprise an improved UL transmission efficiency on unlicensed carriers, e.g. since overlapping resource grants and flexible resource grants valid over a time window are made more feasible.

To perform the method actions herein a network node 110 and a wireless device 121 are provided. FIGS. 16-19 are block diagrams depicting the network node 110 and the wireless device 121. The network node 110 is configured to perform the method described for the network node 110 in the above embodiments herein, while the wireless device 121 is configured to perform the method described for the wireless device 121 in the above embodiments herein.

Figure 17:
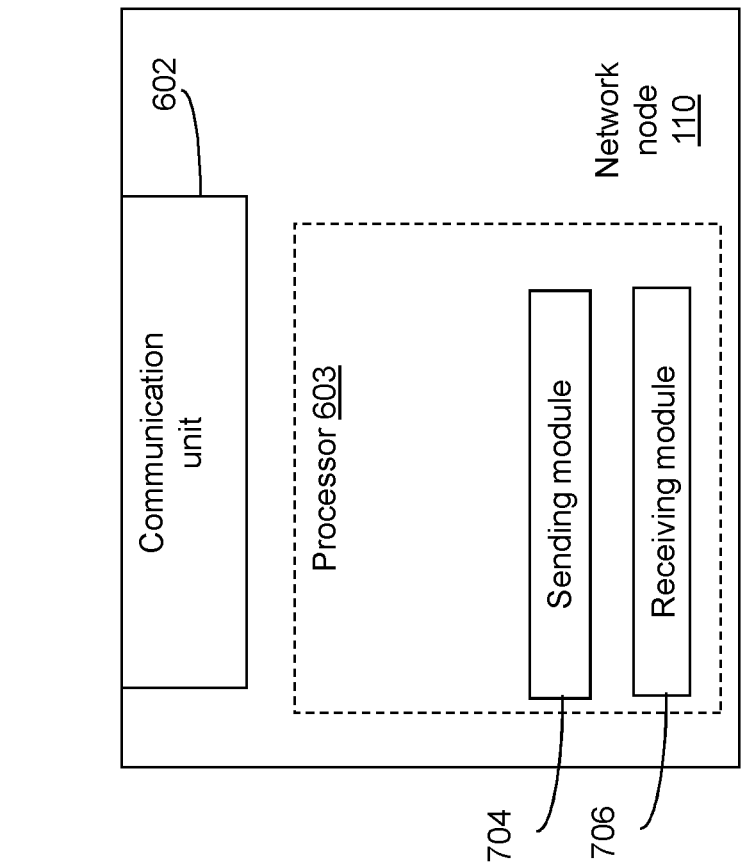
FIGS. 16-17 are schematic block diagrams of exemplary embodiments of a network node.
Figure 16:
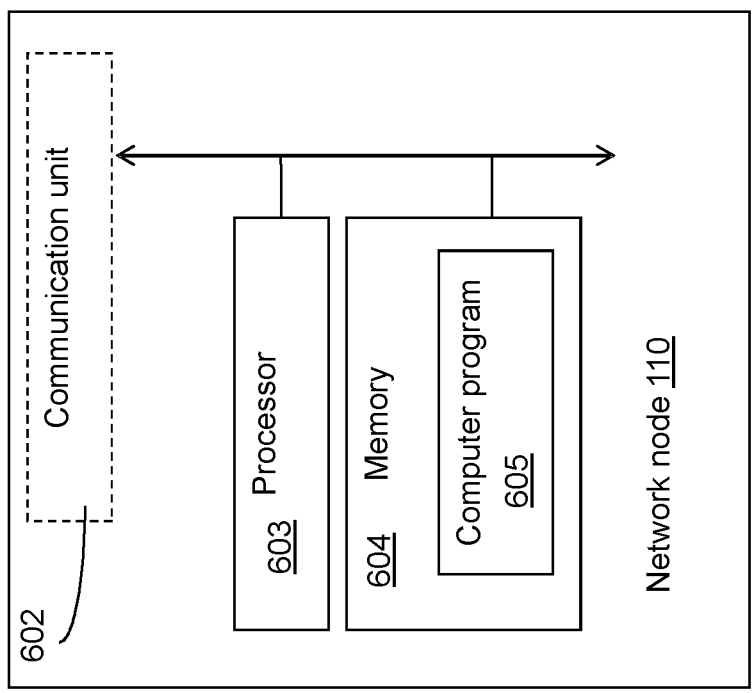

For the network node 110, the embodiments herein for communicating at an unlicensed frequency spectrum with a wireless device 121 having a device identity in a wireless communications network 100 may be implemented through one or more processors 603 in the network node 110 depicted in FIGS. 16 and 17, together with computer program code 605 for performing the functions and/or method actions of the embodiments herein. The program code mentioned above may also be provided as a computer program product, for instance in the form of a data carrier carrying computer program code for performing embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110. The network node 110 may further comprise a communication unit 602 for wireless communication with the wireless devices 121, 122. The communication unit may be a wireless receiver and transmitter or a transceiver. The network node 110 further comprises a memory 604. The memory 604 may, for example, be used to store applications or programs to perform the methods herein and/or any information used by such applications or programs. The computer program code may be downloaded in the memory 604. The network node 110 may further comprise an input/output interface (not shown), which may be used to communicate over a wired connection with other radio network entities or nodes in the wireless communications network 100. The network node 110 may according to the embodiment of FIG. 17 comprise a sending module 704 for sending an access grant according to the embodiments described herein, and a receiving module 706, for receiving data on the granted uplink channel, the data comprising device identity information.

Figure 19:
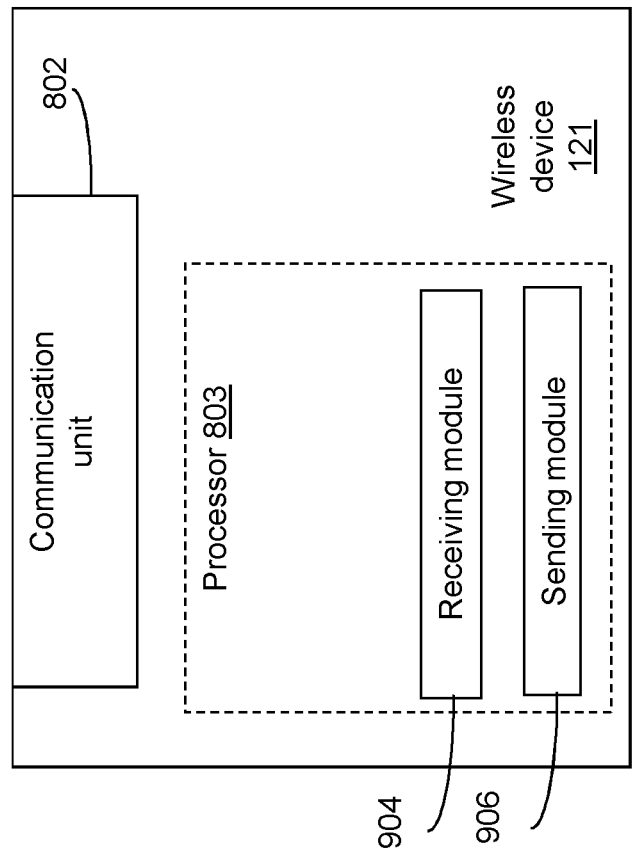
FIGS. 18-19 are schematic block diagrams of exemplary embodiments of a wireless device.
Figure 18:
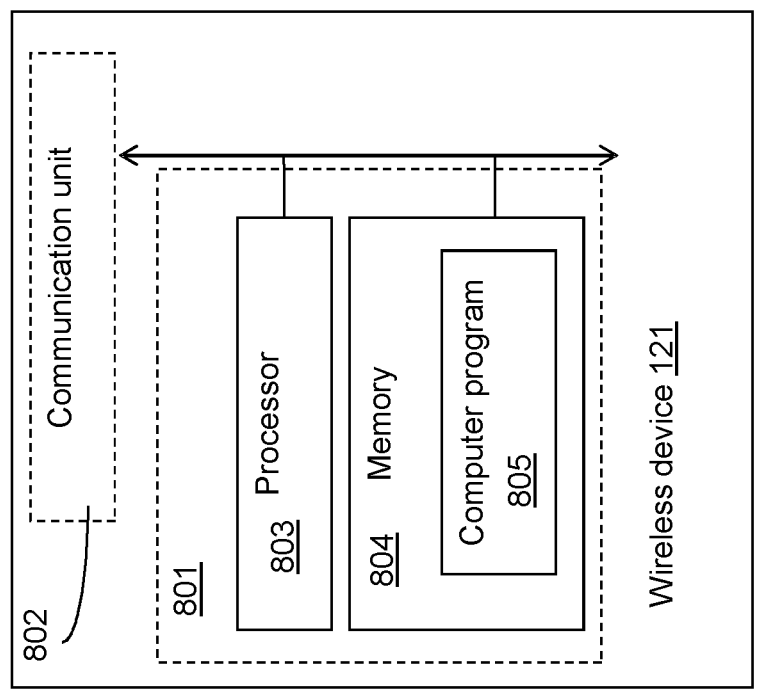

For the wireless device 121, the embodiments herein for communicating at an unlicensed frequency spectrum with a network node 110 in a wireless communications network 100 may be implemented through one or more processors 803 in the wireless device 121 depicted in FIGS. 18 and 19, together with computer program code 805 for performing the functions and/or method actions of the embodiments herein. The program code mentioned above may also be provided as a computer program product, for instance in the form of a data carrier carrying computer program code for performing embodiments herein when being loaded into the wireless device 121. One such carrier may be in the form of a CD ROM disc. It is however feasible with other data carriers such as a memory stick. The computer program code may furthermore be provided as pure program code on a server and downloaded to the wireless device 121. The wireless device 121 may further comprise a communication unit 802 for wireless communication with the network node 110. The communication unit may be a wireless receiver and transmitter or a wireless transceiver. The wireless device 121 further comprises a memory 804. The memory 804 may, for example, be used to store applications or programs to perform the methods herein and/or any information used by such applications or programs. The computer program code may be downloaded in the memory 804. The network node 110 may according to the embodiment of FIG. 17 comprise a receiving module 904 for receiving an access grant according to the embodiments described herein, and a sending module 906, for sending data on the granted uplink channel to the network node, the data comprising device identity information.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of processing circuits discussed may be provided through the use of dedicated hardware, while others are provided with hardware for executing software, in association with the appropriate software or firmware. Thus, the term "processor" or "controller" as may be used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices. The different actions taken by the different nodes may be implemented with different circuits.

From the above it may be seen that the embodiments may further comprise a computer program product, comprising instructions which, when executed on at least one processor, e.g. the processors 603 or 803, cause the at least one processor to carry out any of the methods for communicating at an unlicensed frequency spectrum in a wireless communications network 100. Also, some embodiments may, as described above, further comprise a carrier containing said computer program, wherein the carrier is one of an electronic signal, optical signal, radio signal, or computer readable storage medium.

The terminology used in the detailed description of the particular exemplary embodiments illustrated in the accompanying drawings is not intended to be limiting of the described methods, network node 110 and wireless device 121.

As used herein, the term "and/or" comprises any and all combinations of one or more of the associated listed items. Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist. As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The embodiments herein are not limited to the above described preferred embodiments. Various alternatives, modifications and equivalents may be used. Therefore, the above embodiments should not be construed as limiting.

According to a further aspect of the embodiments herein, one object of the embodiments herein may also be to address at least some of the problems and issues outlined in background part above. The wireless device 121 may be a device normally not communicating over the unlicensed frequency spectrum. The wireless device may be a 3GPP-compatible device.

According to yet a further aspect of the embodiments herein, the object may be achieved by a method performed by a network node of a wireless communication network, for communicating at an unlicensed frequency spectrum with a wireless communication device having a device identity. The method may comprise sending an access grant to the communication device according to the device identity, granting the communication device access to an uplink communication channel of the unlicensed frequency spectrum, and receiving data from the communication device, on the granted uplink channel, the data comprising information on the identity of the device, thus enabling the network node to detect whether the communication device that was granted access on the uplink channel is the same communication device as the device from which the data comprising the information on the uplink channel was subsequently received.

According to some embodiments herein, the uplink channel may be a Physical Uplink Shared Channel, PUSCH. The method may also comprise, before sending the access grant, a step of receiving an access request message from the communication device, requesting access to the unlicensed frequency spectrum. This access request message may comprise a first information of the device identity. Alternatively, the network node may assign the device identity, e.g. in response to the received access request. The step of sending the access grant may be performed in response to the received access request. The wireless communication device may have a primary connection to a wireless network at a licensed frequency spectrum. The uplink communication channel to which the device is granted access above may be a secondary connection to which the device gets access when the primary connection is already set-up.

In some embodiments, the method may further comprises granting the communication device access to the uplink communication channel in response to a received access request message, and wherein the sending of an access grant is performed in response to the granting of the access.

According to a further aspect of the embodiments herein, the method may further comprise storing the device identity associated with the access grant.

According to some further aspects of the embodiments herein, the method may further comprise determining, in response to the reception of the data comprising the device identity information that the device identity information corresponds to the device to which the access grant was sent, e.g. by comparing the received device identity information to the stored device identity. Further, the received device identity information may be a data block cyclic redundancy check scrambled with the device identity. According to an embodiment, the determining may comprise descrambling the received device identity information using the stored device identity and determining that the stored device identity and the received device identity information corresponds to the same device identity when the descrambling is successful.

In some embodiments, the device identity is a Cell Radio Network Temporary Identifier, C-RNTI, for the communication device.

In some embodiments, the device identity information is received in an Uplink Control Information, UCI, transmission on the uplink channel. The device identity information may be received on the first and/or last symbol of a transmission slot of the UCI transmission on the uplink channel. The device identity information may be the actual device identity. The device identity may be the C-RNTI of the device. The device identity information may be concatenated with the UCI transmission on the uplink channel, or with other information of the UCI transmission, and possibly jointly encoded with this/these UCI transmissions. The device identity information may be scrambled with the redundancy check of the UCI transmission on the uplink channel.

In some embodiments, the data comprising the device identity information is received before any data communication has been received on the uplink communication channel from the device in response to the sent access grant. The phrase "before any data communication has been received on the uplink communication channel" may signify that the device identity information is received as an initial signal after the network node sent the access grant and before any data blocks has been received from the device on the channel.

In some embodiments, the method further comprises sending a signal to the device assigning a cyclic shift and/or an orthogonal cover code, OCC, for communication on the channel, the cyclic shift and/or OCC being different from other cyclic shifts and/or OCCs assigned to other devices that have been granted access to the channel. The received device identity information is then the cyclic shift and/or the OCC.

In some embodiments, the method further comprises instructing the communication device to select a cyclic shift and/or Orthogonal cover code, OCC, based on the device identity, e.g. C-RNTI or mobile network code-user equipment, MNC-UE, identity. The received device identity information is then the cyclic shift and/or the OCC.

The cyclic shift and/or the OCC may be sent on the Demodulation Reference Signal, DMRS.

In some embodiments, the data received from the communication device on the granted uplink channel further comprises information on a mobile network identity, identifying the network to which the communication device belongs. The information on the mobile network identity may be a PLMN-ID. The PLMN-ID, or part of the PLMN-ID, may be combined with the UE C-RNTI, and the thus combined ID information may be sent to the network node.

According to another aspect of embodiments herein, the object may be achieved by providing a method performed by a wireless communication device of a wireless communication network, for communicating with a network node of the wireless communication network at an unlicensed frequency spectrum, the device having a device identity. The method comprises receiving an access grant from the network node, granting the communication device access to an uplink communication channel of the unlicensed frequency spectrum, and sending data to the network node on the granted uplink channel, the data comprising information on the identity of the device, thus enabling the network node to detect whether the communication device that was granted access on the uplink channel is the same communication device that subsequently sent the data comprising the information on the uplink channel.

In some embodiments, the method further comprises sending an access request message to the network node, requesting access to the unlicensed frequency spectrum provided by the network node. The message may comprising a first information of the wireless communication device identity.

In some embodiments, the sent device identity information is a data block cyclic redundancy check scrambled with the device identity.

In some embodiments, the device identity information is sent in an Uplink Control Information, UCI, transmission on the uplink channel.

In some embodiments, the data comprising the second information on the identity of the device is sent before the device has sent any other data communication on the uplink communication channel to the network node after receiving the access grant.

In some embodiments, the method further comprises receiving a signal from the network node assigning a cyclic shift and/or an orthogonal cover code, OCC, for communication on the channel, the cyclic shift and/or OCC being different from other cyclic shifts and/or OCCs assigned to other devices that have been granted access to the channel. The sent device identity information is the cyclic shift and/or the OCC.

In some embodiments, the method further comprises selecting a cyclic shift and/or Orthogonal cover code, OCC, based on the device identity, e.g. the C-RNTI or mobile network code-user equipment, MNC-UE, identity. The sent device identity information is the cyclic shift and/or the OCC.

ABBREVIATIONS

CC Component Carrier
CCA Clear Channel Assessment
CQI Channel Quality Information
CRC Cyclic Redundancy Check
DCI Downlink Control Information
DL Downlink
DRS Discovery Reference Signal
eNB evolved NodeB, base station
UE User Equipment
UL Uplink
LAA Licensed-Assisted Access
SCell Secondary Cell
STA Station
LBT Listen-before-talk
LTE-U LTE in Unlicensed Spectrum
PDCCH Physical Downlink Control Channel
PMI Precoding Matrix Indicator
PUSCH Physical Uplink Shared Channel
RAT Radio Access Technology
RNTI Radio Network Temporary Identifier
TXOP Transmission Opportunity
UL Uplink

The invention claimed is:

1. A method performed by a network node of a wireless communication network, for communicating at an unlicensed frequency spectrum with a wireless device having a device identity, the method comprises:
    sending an access grant to the wireless device according to the device identity, granting the wireless device access to an uplink communication channel of the unlicensed frequency spectrum; and
    receiving data from the wireless device, on the granted uplink communication channel, the data comprising information on the identity of the wireless device, thus enabling the network node to detect whether the wireless device that was granted access on the uplink communication channel is the same wireless device as the wireless device from which the data comprising the information on the uplink communication channel was subsequently received.

2. The method according to claim 1, further comprising:
    granting the wireless device access to the uplink communication channel in response to a received access request message, and wherein the sending of an access grant is performed in response to the granting of the access.

3. The method according to claim 1, further comprising:
    storing the device identity associated with the access grant; and
    determining, in response to the reception of the data comprising the device identity information, that the device identity information corresponds to the wireless device to which the access grant was sent.

4. The method according to claim 1, wherein the received device identity information is a data block cyclic redundancy check scrambled with the device identity.

5. The method according to claim 3, wherein the determining comprises descrambling the received device identity information using the stored device identity and determining that the stored device identity and the received device identity information corresponds to the same device identity when the descrambling is successful.

6. The method according to claim 1, wherein the device identity information is received in an Uplink Control Information, UCI, transmission on the uplink communication channel.

7. A network node operable in a wireless communication network and configured for communicating at an unlicensed frequency spectrum with a wireless device having a device identity, the network node being operative to:
    send an access grant to the wireless device according to the device identity, granting the wireless device access to an uplink communication channel of the unlicensed frequency spectrum, and
    receive data from the wireless device, on the granted uplink communication channel, the data comprising information on the identity of the wireless device, thus enabling the network node to detect whether the wireless device that was granted access on the uplink communication channel is the same wireless device as the wireless device from which the data comprising the information on the uplink communication channel was subsequently received.

8. The network node according to claim 7, further being operative to:
    grant the wireless device access to the uplink communication channel in response to a received access request message, and wherein the sending of an access grant is performed in response to the granting of the access.

9. The network node according to claim 7, further being operative to:
    store the device identity associated with the access grant, and determine, in response to the reception of the data comprising the device identity information, that the device identity information corresponds to the wireless device to which the access grant was sent.

10. The network node according to claim 8, wherein the received device identity information is a data block cyclic redundancy check scrambled with the device identity.

11. The network node according to claim 10, wherein the determining comprises:
descrambling the received device identity information using the stored device identity; and
determining that the stored device identity and the received device identity information corresponds to the same device identity when the descrambling is successful.

12. A method performed by a wireless device of a wireless communication network, for communicating with a network node of the wireless communication network at an unlicensed frequency spectrum, the wireless device having a device identity, the method comprises:
receiving an access grant from the network node, granting the wireless device access to an uplink communication channel of the unlicensed frequency spectrum; and
sending data to the network node on the granted uplink communication channel, the data comprising information on the identity of the wireless device, thus enabling the network node to detect whether the wireless device that was granted access on the uplink communication channel is the same wireless device that subsequently sent the data comprising the information on the uplink communication channel.

13. The method according to claim 12, further comprising:
sending an access request message to the network node, requesting access to the unlicensed frequency spectrum provided by the network node.

14. The method according to claim 12, wherein the sent device identity information is a data block cyclic redundancy check scrambled with the device identity.

15. The method according to claim 12, wherein the device identity information is sent in an Uplink Control Information, UCI, transmission on the uplink communication channel.

16. The method according to claim 12, wherein the data comprising the information on the identity of the wireless device is sent before the wireless device has sent any other data communication on the uplink communication channel to the network node after receiving the access grant.

17. The method according to claim 12, further comprising:
receiving a signal from the network node assigning a cyclic shift and/or an orthogonal cover code, OCC, for communication on the uplink communication channel, the cyclic shift and/or OCC being different from other cyclic shifts and/or OCCs assigned to other wireless devices that have been granted access to the uplink communication channel; and
wherein the sent device identity information is the cyclic shift and/or the OCC.

18. A wireless device operable in a wireless communication network and configured for communicating with a network node of the wireless communication network at an unlicensed frequency spectrum, the wireless device having a device identity, the wireless device comprising processing circuitry, memory and transceiver circuitry collectively configured to:
receive an access grant from the network node, granting the wireless device access to an uplink communication channel of the unlicensed frequency spectrum, and send data to the network node on the granted uplink communication channel, the data comprising information on the identity of the wireless device, thus enabling the network node to detect whether the wireless device that was granted access on the uplink communication channel is the same wireless device that subsequently sent the data comprising the information on the uplink communication channel.

19. The wireless device according to claim 18, further being configured to send an access request message to the network node, requesting access to the unlicensed frequency spectrum provided by the network node.

20. The wireless device according to claim 18, wherein the sent device identity information is a data block cyclic redundancy check scrambled with the device identity.

21. The wireless device according to claim 18, wherein the device identity information is sent in an Uplink Control Information, UCI, transmission on the uplink communication channel.

22. The wireless device according to claim 18, wherein the data comprising the second information on the identity of the wireless device is sent before the wireless device has sent any other data communication on the uplink communication channel to the network node after receiving the access grant.

* * * * *

UNITED STATES PATENT AND TRADEMARK OFFICE
CERTIFICATE OF CORRECTION

PATENT NO. : 10,932,291 B2  
APPLICATION NO. : 15/765890  
DATED : February 23, 2021  
INVENTOR(S) : Mukherjee et al.

Page 1 of 2

It is certified that error appears in the above-identified patent and that said Letters Patent is hereby corrected as shown below:

In the Specification

In Column 1, Line 8, delete "37" and insert -- 371 --, therefor.

In Column 1, Line 9, delete "PCT/5E20167050940" and insert -- PCT/SE2016/050940 --, therefor.

In Column 2, Line 45, delete "symbols (CRS)" and insert -- symbol (CRSs) --, therefor.

In Column 3, Line 16, delete "in" and insert -- is --, therefor.

In Column 4, Line 25, delete "DSF," and insert -- DCF, --, therefor.

In Column 8, Line 10, delete "aggregation." and insert -- aggregation, --, therefor.

In Column 8, Line 12, delete "Wi-Fi." and insert -- Wi-Fi, --, therefor.

In Column 8, Line 14, delete "301.893" and insert -- 301.893, --, therefor.

In Column 8, Lines 16-17, delete "aggregation." and insert -- aggregation, --, therefor.

In Column 8, Line 20, delete "used." and insert -- used, --, therefor.

In Column 8, Line 22, delete "node." and insert -- node, --, therefor.

In Column 8, Line 24, delete "device." and insert -- device, --, therefor.

In Column 8, Line 26, delete "transmissions." and insert -- transmissions, --, therefor.

In Column 8, Line 28, delete "signal." and insert -- signal, --, therefor.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,932,291 B2

In Column 8, Line 30, delete "node." and insert -- node, --, therefor.

In Column 8, Line 34, delete "DESCRIPTION" and insert -- DETAILED DESCRIPTION --, therefor.

In Column 8, Line 66, delete "Remote Radio Units (RRU)." and insert -- Remote Radio Units (RRUs). --, therefor.

In Column 9, Line 6, delete "110" and insert -- 110. --, therefor.

In Column 10, Line 36, delete "may" and insert -- may be --, therefor.

In Column 11, Line 11, delete "may" and insert -- may be --, therefor.

In Column 13, Line 7, delete "CD ROM" and insert -- CD-ROM --, therefor.

In Column 17, Line 7, delete "may" and insert -- may be --, therefor.

In Column 17, Line 45, delete "eNB evolved NodeB, base station" and insert -- eNB evolved NodeB, BS base station --, therefor.

In the Claims

In Column 20, Line 40, in Claim 22, delete "the second" and insert -- the --, therefor.